United States Patent
Pulvirenti et al.

(10) Patent No.: US 6,690,755 B1
(45) Date of Patent: Feb. 10, 2004

(54) CIRCUIT FOR DETECTING DIGITAL SIGNALS, PARTICULARLY FOR A SYSTEM WITH AN ASI FIELD BUS

(75) Inventors: Francesco Pulvirenti, Catania (IT); Gregorio Bontempo, Messina (IT); Gaetano Palumbo, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/436,915

(22) Filed: Nov. 9, 1999

(30) Foreign Application Priority Data

Nov. 9, 1998  (EP) ............................................. 98830672

(51) Int. Cl.$^7$ ................................................. H04B 1/10
(52) U.S. Cl. ...................................... 375/350; 327/558
(58) Field of Search ................................. 375/257, 256, 375/259, 260, 224, 316, 317, 318, 340, 350; 327/1, 72, 551, 558

(56) References Cited

U.S. PATENT DOCUMENTS

| | | | | |
|---|---|---|---|---|
| 3,800,090 A | * | 3/1974 | Matena | 379/33 |
| 4,989,220 A | * | 1/1991 | Serrone | 375/83 |
| 5,287,404 A | * | 2/1994 | Pepper et al. | 379/377 |
| 5,396,521 A | * | 3/1995 | Minami | 375/344 |

FOREIGN PATENT DOCUMENTS

| | | |
|---|---|---|
| DE | 42 21 916 A | 1/1994 |
| EP | 0 858 142 A1 | 8/1998 |

* cited by examiner

*Primary Examiner*—Jean B. Corrielus
(74) *Attorney, Agent, or Firm*—Lisa K. Jorgenson; E. Russell Tarleton; Seed IP Law Group PLLC

(57) ABSTRACT

A circuit for detecting signals present on a bifilar voltage-supply and signal-transmission line, in which the signals are constituted by positive and negative variations of the supply potential of at least one of the wires of the line, the circuit including a low-pass filter connected to the two wires of the line in order to supply, at an output terminal of the filter, a constant reference potential substantially equal to the supply potential of a preselected one of the two wires, a first threshold comparator having a reference input terminal and a threshold input terminal connected, respectively, to the output terminal of the filter and to the preselected wire of the two wires, and a second threshold comparator having a reference input terminal and a threshold input terminal connected, respectively, to the preselected wire of the two wires and to the output terminal of the filter. The circuit is relatively simple, does not require synchronization signals, and can be formed as an integrated circuit, taking up a limited area.

16 Claims, 7 Drawing Sheets

US 6,690,755 B1

CIRCUIT FOR DETECTING DIGITAL SIGNALS, PARTICULARLY FOR A SYSTEM WITH AN ASI FIELD BUS

TECHNICAL FIELD OF THE INVENTION

The present invention relates to a circuit for detecting signals present on a bifilar voltage-supply and signal-transmission line in which the signals are constituted by positive and negative variations of the supply potential of at least one of the wires of the line.

BACKGROUND OF THE INVENTION

Digital signal detection circuits are used, for example in a digital-data communication system with an ASI (actuator-sensor interface) field bus and, more precisely, in the data-receiving stage. An ASI communication system serves for the remote control of sensors and actuators in the industrial automation field.

FIG. 1 of the appended drawings shows the main components of an ASI communication system. Transmission takes place on a bus constituted by a bifilar line 2 which also serves for the supply of the entire system. A voltage supply 3 is connected to the line by means of a decoupling device 4. As shown in FIG. 2, a positive potential V+, for example +15V, and a negative potential V−, for example −15V, relative to a reference terminal indicated by the ground symbol in FIG. 2, are applied to the two wires of the line, respectively. The decoupling device 4 comprises two inductors L, for example, of 50 $\mu$H, each in parallel with a resistor R, for example, of 39 ohms, on a respective one of the two wires of the line.

A supervision (master) unit 5 and various subservient (slave) units 6 are connected to the line. The master unit 5 contains a central controller and transmission and receiving members for controlling data communication and the management of the system by means of a suitable interface. Each slave unit 6 contains members for transmitting, receiving, and processing the data to be sent on the line 2 or to be taken therefrom and is connected to sensors and actuators 7. The transmission members generate signals that are applied to the line as variations of the supply potentials V+ and V− of the two wires by alternating pulse modulation (APM), and that are transmitted on the line in series.

FIG. 3 shows, in the form of graphs (a) to (g), how the APM modulation takes place and how the signal is transmitted and reconstructed. Graph (a) indicates a sequence of bits to be transmitted, graph (b) shows the same sequence encoded in accordance with the Manchester code (switching, at the center of the bit time, downwards for a bit equal to 0 and upwards for a bit equal to 1), and graph (c) shows the corresponding current signal sent by the transmission member on the line. For each change in current, the line responds, for each wire, with a voltage pulse (positive if the current changes from a maximum level Im to 0 and negative if the current changes from 0 to Im).

As shown in graphs (d1) and (d2), the potential of each of the wires is constituted by the superimposition of the supply potential V+ and V− and the variation v in potential, for example ±1V, due to the signal. Each wire carries the whole signal, represented by potentials of opposite sign. With this type of modulation, the polarities of two successive pulses are always opposite. The signal is decoded by reading the polarities of the pulses at intervals equal to one bit time (for example 6 $\mu$s). In particular, if the pulse is positive, the datum read is logic 1 and vice versa. Graphs (e) and (f) show two square-wave sequences corresponding, respectively, to negative pulses and to positive pulses of the signal present on the positive wire of the line, that is, the line with the supply potential V+. Graph (g) shows the bit sequence reconstructed in accordance with the Manchester code.

A known circuit for detecting the voltage pulses on the two wires of the transmission line is shown in a block diagram in FIG. 4. The ASI+ and ASI− signal present on the wires of the line 2 is amplified in an amplifier 10 and discriminated by two diodes 11a and 11b. A detection path for the positive pulse and a detection path for the negative path are thus formed. In each of the two paths, the signal is passed through a band-pass filter 12a, 12b and then detected by a threshold comparator 13a, 13b. The thresholds of the comparators are fixed at the value of the continuous component of the voltage at the output of the amplifier 10 derived, for example, by a sample-and-hold circuit 14 the operation of which is synchronized by a clock signal CLK. The outputs of the two comparators thus supply the positive sequence and the negative sequence of the signal which are then processed in a sequence-control circuit 15 in order to reconstruct the digital signal transmitted and to eliminate any errors introduced in transmission.

The known circuit described above is quite complex and requires the use of a synchronization signal.

SUMMARY OF THE INVENTION

The present invention provides a digital signal detection circuit that performs signal detection in a manner that is simpler than the signal detection performed by prior art detection circuits and does not require a synchronization signal.

BRIEF DESCRIPTION OF THE DRAWINGS

The invention will be understood better from the following detailed description of embodiments thereof described by way of non-limiting example, with reference to the appended drawings, in which.

DETAILED DESCRIPTION OF THE INVENTION

Figure 1:
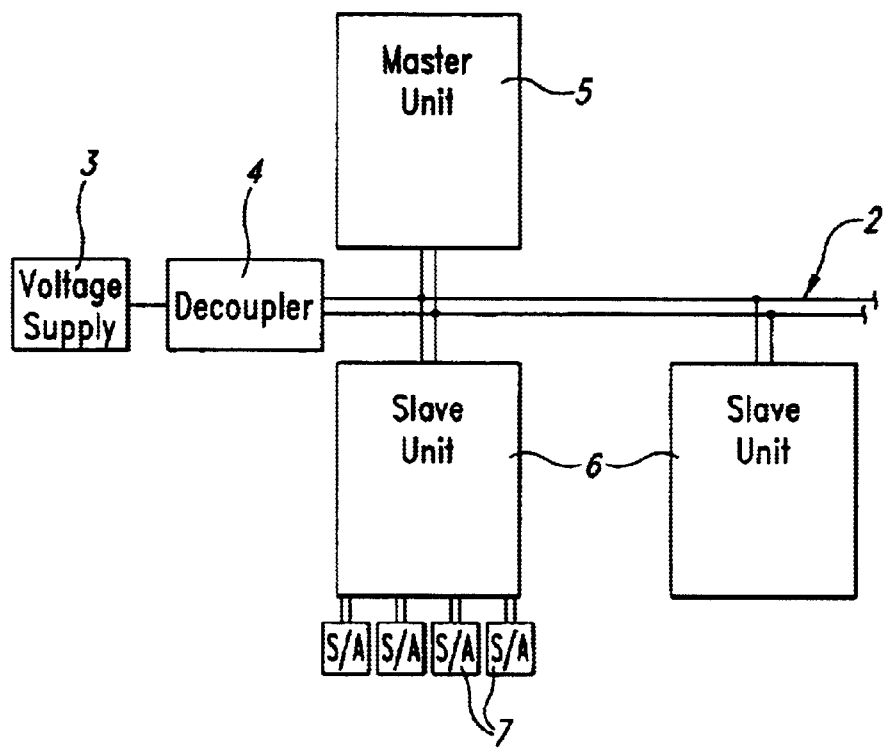
FIG. 1 is a block diagram of an ASI system in which the invention can be used.
Figure 2:
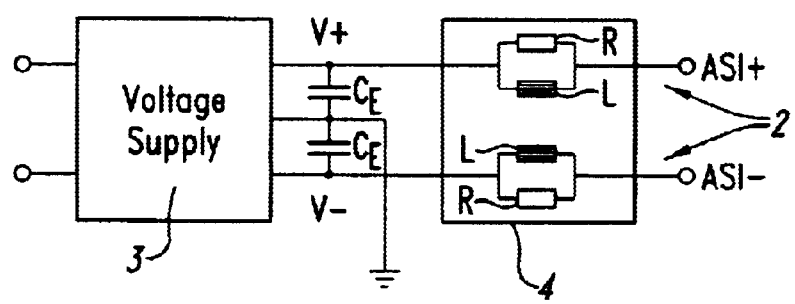
FIG. 2 is a circuit diagram, partially in block form, of a detail of the system of FIG. 1.
Figure 3:
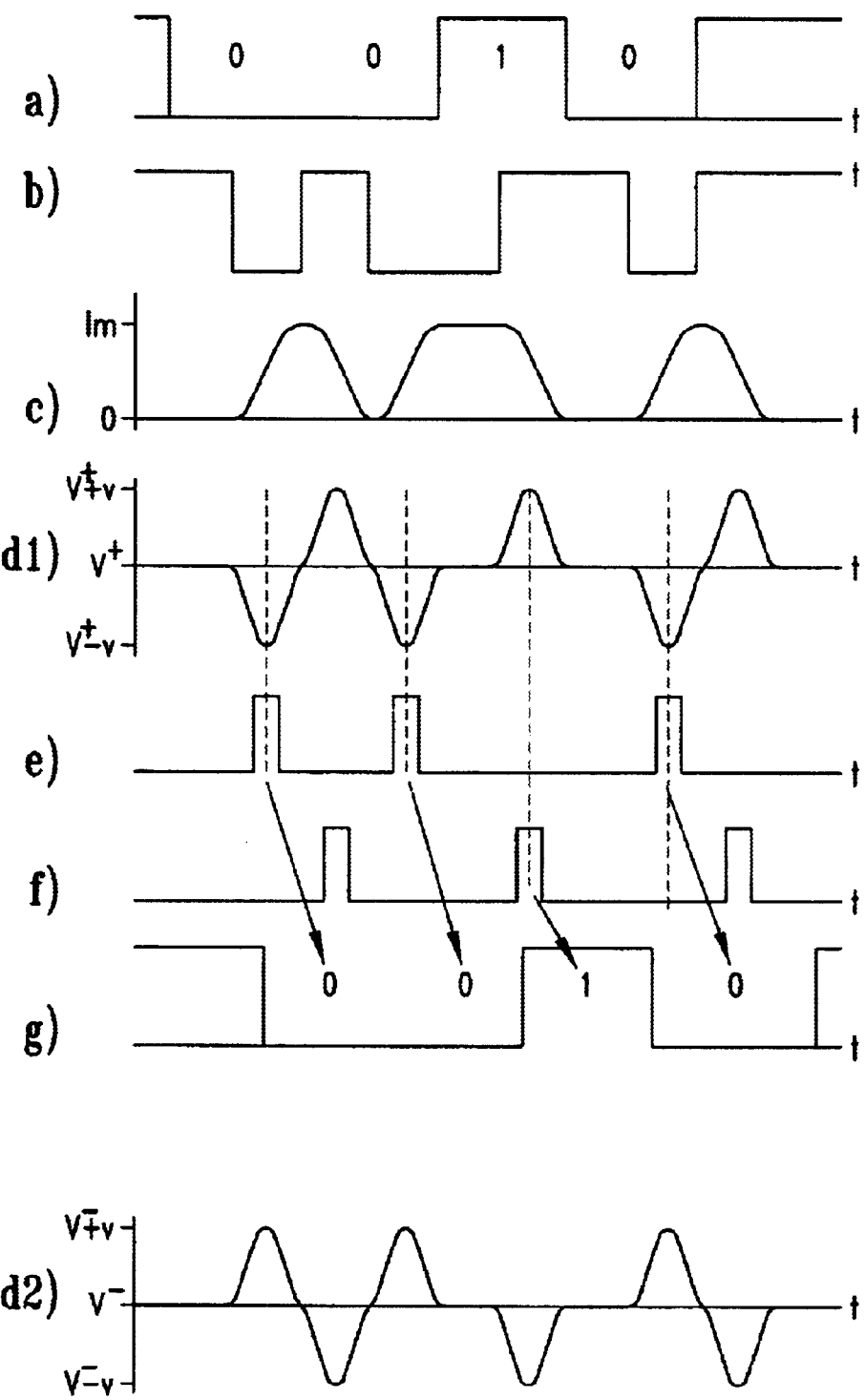
FIG. 3 shows waveforms a) to g) which illustrate the operation of an ASI system.
Figure 4:
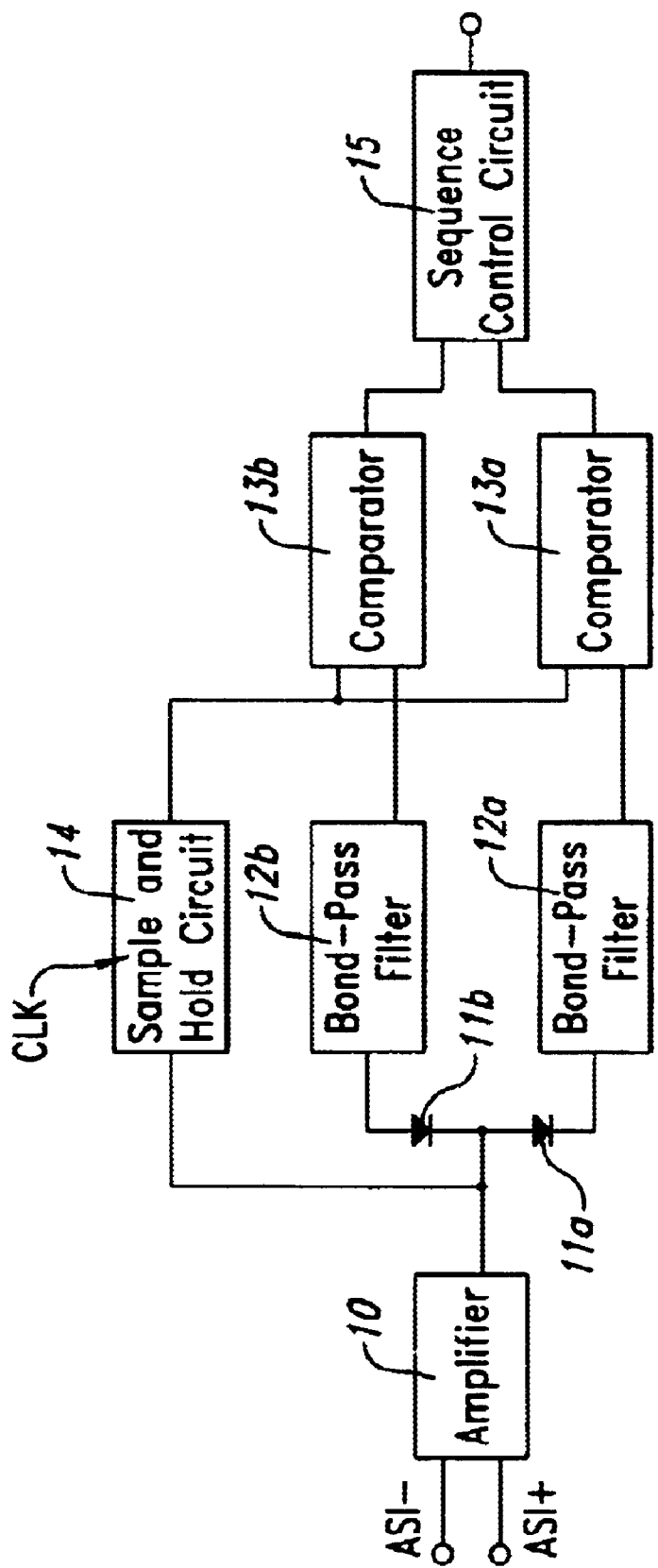
FIG. 4 is a block diagram of a known circuit for detecting the signal present on a line of an ASI system.
Figure 5:
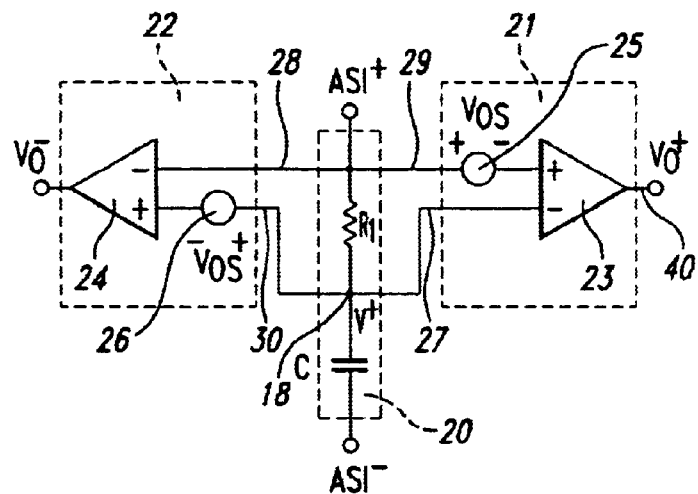
FIG. 5 is a circuit diagram, partially in block form, of a circuit according to the invention for detecting the signal on a line of an ASI system.

The circuit of FIG. 5 is constituted by a low-pass filter 20 and by two threshold comparators 21, 22. The filter 20 is formed by a resistor R, for example of 200 ohms, and by a capacitor C, for example, of 100 pF, in series with one another and connected between the positive wire and the negative wire of the line. Each of the two threshold comparators 21 and 22 is constituted by an operational amplifier 23 or 24, respectively, and by an offset generator, 25 or 26, respectively, connected in series with the non-inverting input of the respective operational amplifier. Each comparator has a reference terminal 27, 28 connected to the inverting terminal of the respective operational amplifier and a threshold terminal 29, 30 connected to the respective offset generator.

As can be seen, the reference terminal 27 of the comparator 21 and the threshold terminal 30 of the comparator 22 are connected to the output terminal of the filter 20, that is, to the junction 18 between the resistor R and the capacitor C, and the threshold terminal 29 of the comparator 21 and the reference terminal 28 of the comparator 22 are connected to the positive wire of the line.

In operation, at the output 18 of the filter 20, there is a potential V+ which is substantially the potential of the positive wire of the line in the absence of a signal. With the connections described above, the comparator 21 performs a comparison between the potential V+ and the potential ASI+, that is, the potential of the positive wire on which the signal is superimposed, using the voltage Vos of the offset generator 25 as a threshold. This means that, at the non-inverting input of the operational amplifier 23, there is a potential of $$ASI+-Vos.$$

Figure 6:
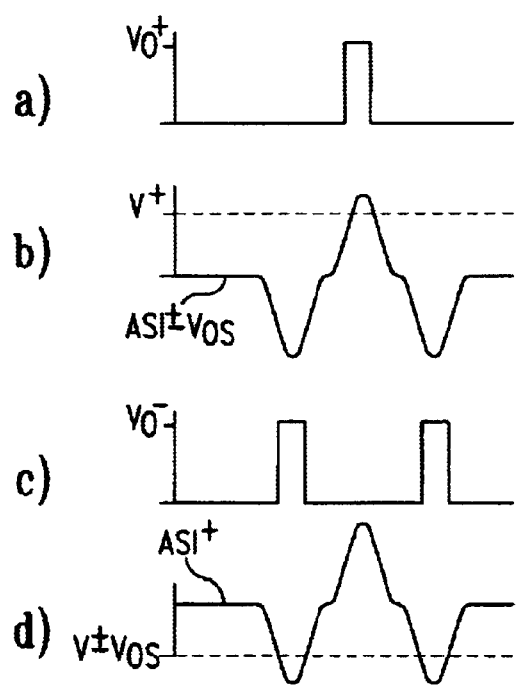
FIG. 6 shows graphs (a) to (d) which illustrate the operation of the circuit of FIG. 5.

As shown in graphs (a) and (b) of FIG. 6, at the output 40 of the comparator 21, there is a voltage pulse Vo+ when the potential ASI+−Vos exceeds the potential V+.

In exactly the same manner, the comparator 22, the input terminals of which have the same potentials as those of the comparator 21 but in reverse order, performs a comparison between the potential ASI+ and the potential V+ and has, as a threshold, the voltage Vos of the offset generator 26. As shown in the graphs (c) and (d) of FIG. 6, when the potential ASI+ falls below the potential V+−Vos of the non-inverting input terminal of the operational amplifier 24, a voltage pulse Vo− appears at the output of the comparator 22. The outputs of the two comparators are the outputs of the detector circuit and supply the signals Vo+ and Vo−, which correspond to the positive and negative pulses of the signal transmitted, to a suitable circuit (not shown) for the reconstruction of the digital signal.

A circuit complementary to that described above may be formed for detecting the signal present on the negative wire of the line. In this case, the low-pass filter will have a resistor connected between the capacitor and the negative terminal and the comparators will have their reference terminals connected, respectively, to the negative wire of the line and to the output of the filter at which the voltage V− of the negative wire in the absence of a signal will be present, the threshold terminals of the comparators being connected, respectively, to the output of the filter and to the negative wire.

Figure 7:
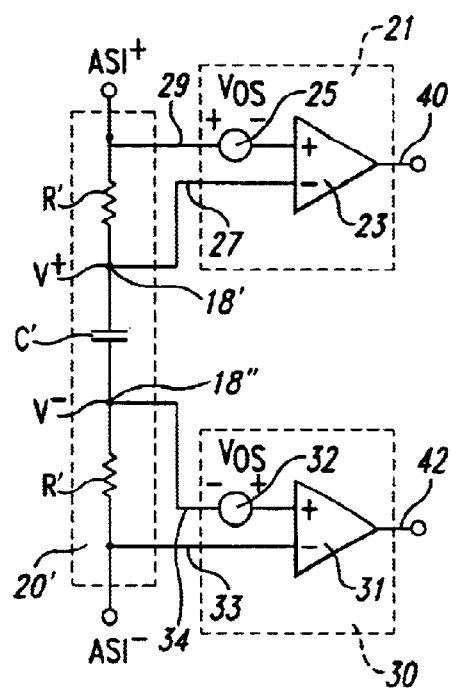
FIG. 7 is a circuit diagram, partially in block form, of a second embodiment of the detector circuit according to the invention.

The circuit of FIG. 7 has a low-pass filter 20' formed by a capacitor C' and by two resistors R' connected, respectively, between a terminal of the capacitor C' and the positive wire of the line, and between the other terminal of the capacitor C' and the negative wire of the line. In operation, the two output terminals of the filter, which are the junctions 18' and 18" of the capacitor C' with the resistors R', have the potentials V+ and V− of the positive wire and of the negative wire of the line in the absence of signals, respectively. A first threshold comparator just like the comparator 21 of FIG. 5 is connected by its reference input terminal 27 to the output terminal 18' (at potential V+) of the filter 20', and by its threshold terminal 29 to the positive wire of the line. A second threshold comparator 30 formed by an operational amplifier 31 and by an offset voltage generator 32 in series with the non-inverting input of the operational amplifier 31 is connected by its reference input terminal 33 to the negative wire of the line and by its threshold input terminal 34 to the output terminal 18" of the filter which is at the potential V−.

Figure 8:
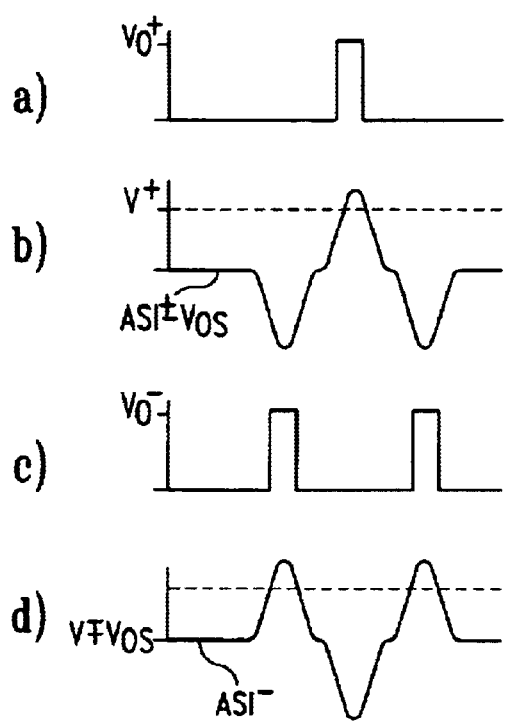
FIG. 8 shows graphs (a) to (d) which illustrate the operation of the circuit of FIG. 7.

Naturally, the first comparator 21 behaves like the comparator 21 of FIG. 5, detecting the positive pulses of the signal present on the positive wire of the line, as shown in graphs (a) and (b) of FIG. 6 or of FIG. 8. The second comparator 30 performs a comparison between the potential ASI− and the potential V−, using the voltage Vos of the offset generator 32 as a threshold. As shown in the graphs (c) and (d) of FIG. 8, when the potential ASI− exceeds the potential V−+Vos of the non-inverting input terminal of the operational amplifier 31, that is, when there are positive pulses of the signal ASI− which correspond to the negative pulses of the signal ASI+, a voltage pulse Vo− appears at the output 42 of the comparator 30. In short, therefore, the output of the comparator 30 of FIG. 7 is the same as that of the comparator 22 of FIG. 5.

Figure 9:
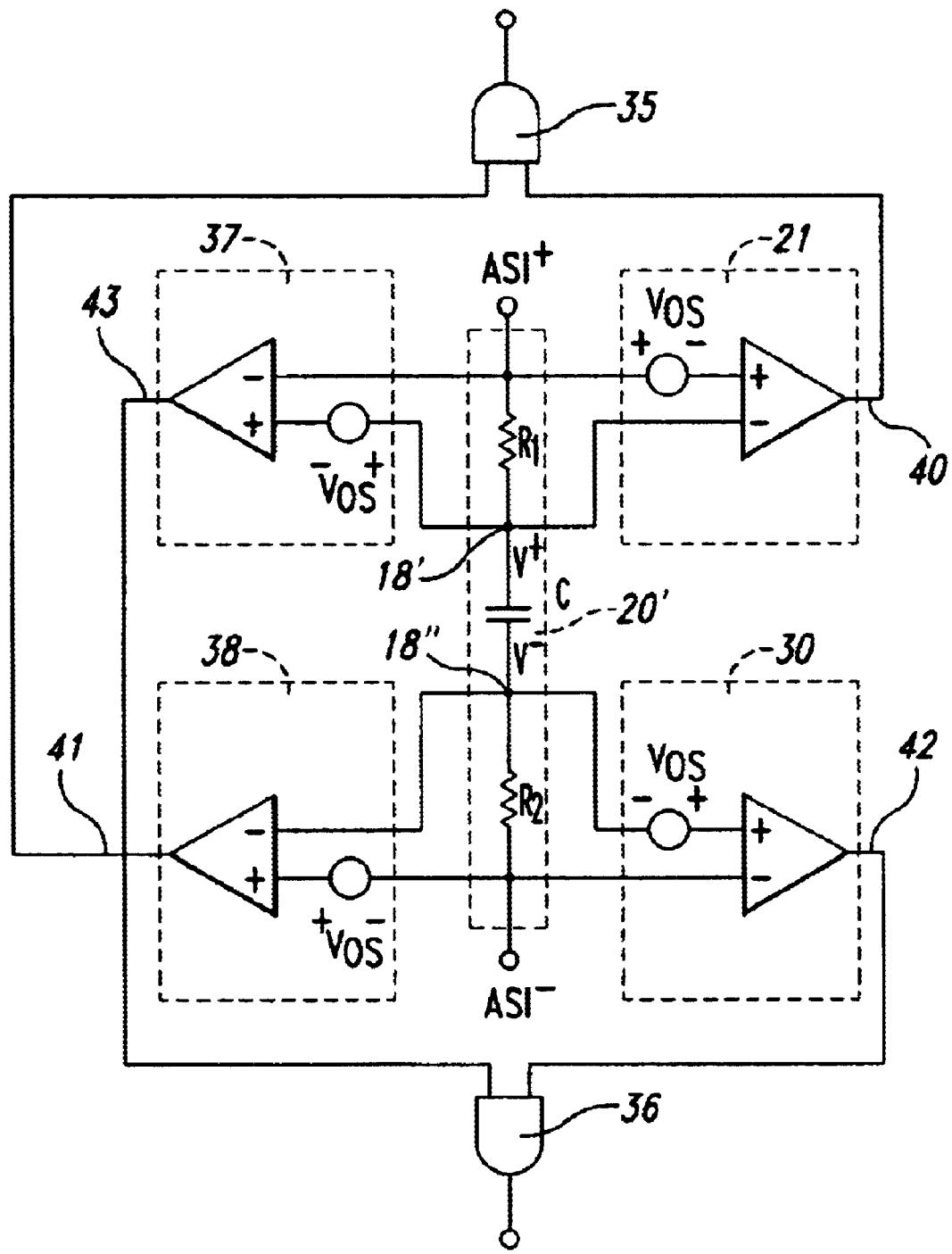
FIG. 9 is a circuit diagram, partially in block form, of a circuit unit according to a preferred/embodiment of the invention.

To prevent the pulse detection process from being affected by common-mode interference on the line, it may be appropriate to form an entirely differential detection circuit unit as shown in FIG. 9. This circuit unit is constituted by a first detector circuit the same as that of FIG. 7, by a second detector circuit of a structure symmetrical to that of FIG. 7, and by two AND logic components 35 and 36. More particularly, the second detector circuit is formed by two comparators 37 and 38 the same as the comparators 21 and 30 but having their respective reference input terminals connected in reverse order.

With these connections, the negative pulses of the signal are detected by the comparator 30 on the negative wire and by the comparator 37 on the positive wire and the positive pulses of the signal are detected by the comparator 21 on the positive wire and by the comparator 38 on the negative wire. The outputs 40 and 41 of the comparators 21 and 38 are connected to the inputs of the AND logic component 35 and the outputs 42 and 43 of the comparators 30 and 37 are connected to the inputs of the AND logic component 36. At the outputs of the AND logic components 35 and 36, which constitute the output terminals of the circuit unit, two signals corresponding to the positive pulses and to the negative pulses of the signal, respectively, are present only when the corresponding positive and negative signals detected independently on the positive wire and on the negative wire of the line are present simultaneously. Any interference on the line which causes a response of only one of the comparators cannot give rise to a signal output on the terminals of the circuit unit.

Figure 10:
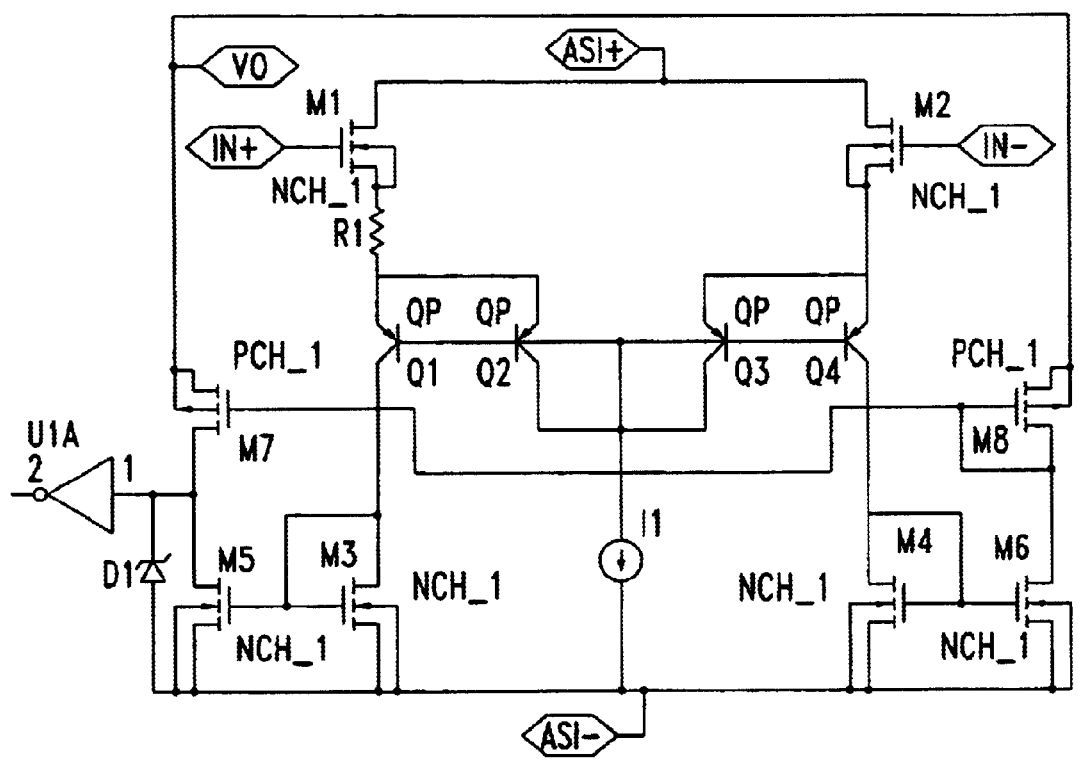
FIG. 10 shows the circuit of a comparator usable in a detector circuit according to the invention.

The comparators usable in the above-described circuit according to the invention must be compatible with the positive potential or compatible with the negative potential, that is, they must have an input range including the positive potential or the negative potential. FIG. 10 shows an embodiment of a comparator circuit compatible with the positive potential of the line. It is constituted basically by an input stage formed by two n-channel MOS transistors M1 and M2 which ensure a high input impedance, a differential stage constituted by four pnp bipolar transistors Q1–Q4 connected so as to form two current mirrors Q1, Q2 and Q3, Q4 with a common constant-current generator I1, an output stage constituted by four n-channel field-effect transistors M3–M6 connected so as to form two current mirrors M3, M5 and M4, M6, and by two p-channel field-effect transistors M7 and M8 having their source terminals connected to a constant reference terminal Vc, and an inverter U1A, a Zener diode D1, and a resistor R1 in one of the two branches of the differential stage.

In operation, a voltage difference between the input terminals which is greater than a threshold value determined by the resistance of the resistor R1 (which therefore acts as an offset generator) causes an imbalance in the current passing through the transistors Q1 and Q4. Switching takes place when the input voltage difference is greater than the product of the resistance of the resistor R1 and of the current I1 of the current generator. The current difference of the differential stage is transferred by the mirror M3, M5 to the input of the inverter U1A. The latter responds with a corresponding voltage signal for driving a circuit with CMOS transistors, not shown. The Zener diode D1 serves for limiting the input voltage of the inverter.

A possible comparator compatible with the negative potential may be formed by complementary components connected to one another in the same manner as the corresponding components of the circuit of FIG. 10.

As can be seen, the detector circuits described above are much simpler than the known circuit and do not require a synchronization signal for their operation. Moreover, they can be formed in an integrated circuit, taking up a very limited area.

Although the invention has been described in relation to a system with an ASI field bus, it may clearly also advantageously be implemented in different fields and, more precisely, in all cases in which a signal constituted by positive and negative variations of a supply potential of a wire of a bifilar line is to be detected, even if the other wire of the line is at a constant potential.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A circuit for detecting signals present on a bifilar voltage-supply and signal-transmission line, in which the signals are constituted by positive and negative variations of a supply potential of at least one of two wires of the line, comprising:

a low-pass filter connected to the two wires of the line in order to supply, at an output terminal of the filter, a constant reference potential substantially equal to a supply potential of a preselected one of the two wires;

a first threshold comparator having a reference input terminal and a threshold input terminal connected, respectively, to the output terminal of the filter and to the preselected wire of the two wires, and an output terminal which constitutes a first output terminal of the circuit; and a second threshold comparator having a reference input terminal and a threshold input terminal connected, respectively, to the preselected wire of the two wires and to the output terminal of the filter, and an output terminal which constitutes a second output terminal of the circuit.

2. A circuit for detecting signals present on a bifilar voltage-supply and signal-transmission line, in which the signals are constituted by positive and negative variations of supply potentials of two wires of the line, comprising:

a low-pass filter connected to the two wires of the line in order to supply, at a first output terminal and at a second output terminal, first and second constant references substantially equal to one and to the other of the supply potentials of the two wires, respectively;

a first threshold comparator having a reference input terminal and a threshold input terminal connected, respectively, to the first output terminal of the filter and to the wire having said one of the supply potentials, and an output terminal which constitutes a first output terminal of the circuit; and a second threshold comparator having a reference input terminal and a threshold input terminal connected, respectively, to the wire having the other of the supply potentials and to the second output terminal of the filter, and an output terminal which constitutes a second output terminal of the circuit.

3. The circuit of claim 2, further comprising:

a third threshold comparator having a reference terminal connected to the wire with said one of the supply potentials, a threshold input terminal connected to the first output terminal of the filter and an output terminal which constitutes a third output terminal of the circuit;

a fourth threshold comparator having a reference terminal connected to the second output terminal of the filter, a threshold input terminal connected to the wire with the other of the supply potentials, and an output terminal which constitutes a fourth output terminal of the circuit;

a first AND logic component having a first input and a second input connected, respectively, to the first output terminal and to the fourth output terminal of the circuit, and an output terminal; and a second AND logic component having a first input and a second input connected, respectively, to the second output terminal and to the third output terminal of the circuit, and an output terminal, the output terminals of the first and second AND logic components being two output terminals of the circuit.

4. A circuit for detecting signals on a dual-wire line having first and second wires, comprising:

a low-pass filter having first and second terminals coupled to the first and second wires of the dual-wire line, respectively, and first and second output terminals to output first and second constant references, respectively, that are substantially equal to first and second supply potentials on the first and second wires, respectively;

a first comparator having a first input coupled to the first wire, a second input coupled to the first output terminal of the low-pass filter, and an output terminal constituting a first output terminal of the circuit; and a second comparator having a first input coupled to the second output terminal of the low-pass filter, a second input terminal coupled to the first wire and an output terminal constituting a second output terminal of the circuit.

5. The circuit of claim 4 wherein the first comparator includes an operational amplifier having a non-inverting input and an inverting input coupled to the first and second inputs of the first comparator, respectively, and further wherein the second comparator includes an operational amplifier having a non-inverting input and an inverting input coupled to the first and second inputs of the second comparator, respectively.

6. The circuit of claim 5, further comprising a first reference voltage source coupled between the non-inverting input of the operational amplifier and the first input of the first comparator and a second reference voltage source coupled between the non-inverting input of the operational amplifier and the first input of the second comparator.

7. The circuit of claim 4 wherein the low-pass filter comprises a capacitor having a first terminal coupled to the second wire of the dual-wire line and a second terminal coupled to an output node, and a resistive element coupled between the output node and the first wire of the dual-wire line.

8. A circuit for detecting signals on a dual-wire line having first and second wires, comprising:

a low-pass filter having first and second terminals coupled to the first and second wires of a dual-wire line, respectively, and first and second output terminals;

a first comparator having a first input coupled to the first wire and a second input coupled to the first output terminal of the low-pass filter, and an output terminal; and a second comparator having a first input coupled to the second output terminal of the low-pass filter and a second input terminal coupled to a second wire and an output terminal.

9. The circuit of claim 8 wherein the first comparator comprises an operational amplifier having a non-inverting input and an inverting input coupled to the first and second input terminals of the first comparator, respectively, and wherein the second comparator includes an operational amplifier having a non-inverting input and an inverting input coupled to the first and second input terminals of the second comparator, respectively.

10. The circuit of claim 9, further comprising a first reference voltage source coupled between the non-inverting input of the operational amplifier and the first terminal of the first comparator and a second reference voltage source coupled between the non-inverting input of the operational amplifier and the first input terminal of the second comparator.

11. The circuit of claim 8 wherein the low-pass filter comprises a first resistor coupled between the first wire of the dual-wire line and a first node, a capacitor coupled between the first node and a second node, and a second resistor coupled between the second node and the second wire of the dual-wire line, and further wherein the first and second nodes comprise the first and second output terminals of the low-pass filter.

12. The circuit of claim 8, further comprising a third comparator having a first input terminal coupled to the first wire of the dual-wire line and a second input terminal coupled to the first output terminal of the low-pass filter, and an output terminal; and a fourth comparator having a first terminal coupled to the second output terminal of the low-pass filter and a second terminal coupled to the second wire of the dual-wire line, and an output terminal.

13. The circuit of claim 12, further comprising:

a first AND circuit component having a first input coupled to the output terminal of the fourth comparator and a second input coupled to the output terminal of the first comparator, and an output terminal constituting a first output terminal of the circuit; and a second AND circuit component having a first input coupled to the output terminal of the third comparator, a second input coupled to the output terminal of the second comparator, and an output constituting a second output of the circuit.

14. The circuit of claim 13 wherein the third comparator comprises an operational amplifier having an inverting input and a non-inverting input coupled to the first and second input terminals of the third comparator, respectively; and further wherein the fourth comparator comprises an operational amplifier having an inverting input and a non-inverting input coupled to the first and second input terminals of the fourth comparator, respectively.

15. The circuit of claim 14, further comprising:

a first reference voltage source coupled between the non-inverting input of the operational amplifier of the third comparator and the second input terminal of the third comparator; and a second reference voltage source coupled between the non-inverting input of the operational amplifier of the fourth comparator and the second input terminal of the fourth comparator.

16. A circuit for detecting signals on a dual-wire line having first and second wires, comprising:

a low-pass filter having first and second terminals coupled to the first and second wires of the dual-wire line, respectively;

a first comparator having a first input coupled to the first wire, a second input coupled to an output terminal of the low-pass filter, and an output terminal constituting a first output terminal of the circuit, the first comparator further comprising an operational amplifier having a non-inverting input and an inverting input coupled to the first and second inputs of the first comparator, respectively;

a second comparator having a first input coupled to the output terminal of the low-pass filter, a second input terminal coupled to the first wire, and an output terminal constituting a second output terminal of the circuit, the second comparator including an operational amplifier having a non-inverting input and an inverting input coupled to the first and second inputs of the second comparator, respectively; and a first reference voltage source coupled between the non-inverting input of the operational amplifier and the first input of the first comparator and a second reference voltage source coupled between the non-inverting input of the operational amplifier of the second comparator and the first input of the second comparator.

* * * * *